United States Patent [19]

Vershure, Jr. et al.

[11] Patent Number: 4,815,277
[45] Date of Patent: Mar. 28, 1989

[54] INTEGRATED POWER UNIT

[75] Inventors: Roy W. Vershure, Jr., Escondido; Colin Rodgers; Jack R. Shekleton, both of San Diego, all of Calif.

[73] Assignee: Sundstrand Corporation, Rockford, Ill.

[21] Appl. No.: 1,818

[22] Filed: Jan. 8, 1987

[51] Int. Cl.[4] ............................................. F02C 7/00
[52] U.S. Cl. ............................... 60/39.142; 60/39.461
[58] Field of Search ............. 60/39.141, 39.142, 39.15, 60/39.461, 727, 39.33, 39.511, 246

[56] References Cited

U.S. PATENT DOCUMENTS

| | | | |
|---|---|---|---|
| 2,643,511 | 6/1953 | Briggs | 60/39.142 |
| 3,965,673 | 6/1976 | Friedrich | 60/39.142 |
| 4,161,102 | 7/1974 | Jasas et al. | 60/39.142 |
| 4,684,081 | 8/1987 | Cronin | 60/39.141 |

*Primary Examiner*—Louis J. Casaregola
*Attorney, Agent, or Firm*—Wood, Dalton, Phillips, Mason & Rowe

[57] ABSTRACT

Duplication of engine and secondary power system components in individual auxiliary and emergency power units is avoided in an integrated power unit including a gas turbine engine 10 having a centrifugal compressor 28 and a turbine 40, a generator 18 coupled to the engine 10, an air inlet 22 to the compressor 28, a first reservoir 82 for combustible fuel, and a first combustor 34, 36 for receiving and combusting compressed air from the compressor 28 and fuel from the reservoir 82 to generate gasses of combustion and feeding the gasses of combustion to the turbine 40 by the provision of a second reservoir 80 for containing a compressed oxidant for combusting fuel from the first reservoir 82, a second combustor 48 for receiving and combusting fuel from the first reservoir 82 and oxidant from the second reservoir 80 to generate gasses of combustion, flow paths 64, 66, 68 for introducing fuel from the reservoir 82 into the gases of combustion from the second combustor 49 to vaporize the fuel and a conduit 50, 52 for directing the combuned gasses of combustion and vaporized fuel to the turbine 40 to drive the same. The apparatus is useful as an auxiliary power unit when the combustor 34, 36 is in use and as an emergency power unit or starter when the combustor 48 is in use.

6 Claims, 2 Drawing Sheets

INTEGRATED POWER UNIT

FIELD OF THE INVENTION

This invention relates to a power unit useful in, for example, aircraft which combine functions of an auxiliary power unit and an emergency power unit and thus is an integrated power unit.

BACKGROUND OF THE INVENTION

In so-called fly-by-wire aircraft, aircraft control surfaces are not linked to the controls by mechanical means. Rather, the linking is via electrical or hydraulic circuits. Consequently, in the event of an electrical power or hydraulic failure, the aerodynamic configuration of the aircraft cannot be altered under the control of the pilot until power is restored. As a result, such aircraft require an emergency power unit which is capable of responding to a power failure and providing a sizable quantity of electrical or hydraulic energy in very short order so that control of the aircraft can be returned to the pilot.

Fly-by-wire aircraft, like other aircraft of more than basic simplicity, also require an auxiliary power unit for providing electrical and hydraulic energy and bleed air when the main engine or engines of the aircraft are not in use.

Quite typically, both an emergency power unit and an auxiliary power unit will employ a gas turbine engine coupled to a generator and a hydraulic pump. Thus, where an aircraft employs an emergency power unit and an auxiliary power unit, it will have two turbines, two generators and two pumps. This of course requires a certain space on the aircraft and will cause some weight concerns While in some aircraft an auxiliary power unit may be easily adapted to serve as an emergency power unit as well, the adaptation is not so simple on high performance aircraft that may operate at rather high altitudes. In particular, because a typical auxiliary power unit turbine is an air breathing turbine, at high altitudes the density of the air will be insufficient to start the turbine and rapidly bring the same up to a speed at which it will operate at that altitude to produce emergency power.

To meet these and other problems, Friedrich, in his U.S. Pat. No. 4,092,824, issued June 6, 1978, proposes a turbine for use in aircraft for starting purposes as well as for driving auxiliary equipment such as a generator and which is capable of operating in a conventional air breathing mode as well as in an emergency mode that does not require the presence of air. In particular, Friedrich includes a supply of hydrazine on the aircraft. Hydrazine is capable of undergoing an exothermic decomposition reaction. According to Friedrich, the heat from this reaction is utilized to vaporize aircraft fuel to provide gas to drive the turbine in an emergency situation.

While the Friedrich solution does solve a number of the previously specified problems, it also creates a few new ones. In particular, the decomposition products of hydrazine can accumulate much like soot within the turbine, something that will decrease turbine efficiency when operated conventionally. Perhaps more significantly, because the basis of the Friedrich system is that of an exothermic decomposition reaction, it necessarily follows that a fuel, such as hydrazine, which is utilized in the system must be sufficiently unstable as to rapidly undergo decomposition. Of course, the presence of a fuel that is not stable in the conventional sense on an aircraft presents hazards of its own.

Still another difficulty resides in the fact that hydrazine and proper storage facilities therefor may not be available at all locations Thus servicing of a system whose hydrazine fuel charge has been partially or wholly consumed becomes a problem. In addition, hydrazine is toxic. Consequently, it is not easily handled Finally, to operate in the non air breathing mode, Friedrich requires the mechanical decoupling of the engine compressor from the turbine. This not only increases the complexity of the engine, but will increase its size and weight as well.

The present invention is directed to overcoming these problems.

SUMMARY OF THE INVENTION

It is the principal object of the invention to provide a new and improved integrated power unit, that is, a power unit which combines the functions of an auxiliary power unit and an emergency power unit. More particularly, it is an object of the invention to provide such an integrated power unit wherein readily available, non-toxic, easily stored stable fuels which, when utilized to drive the unit in an emergency situation, do not leave residue within the unit.

An exemplary embodiment of the invention achieves the foregoing object in an integrated power unit that is alternatively operable as an auxiliary power unit and as an emergency power unit. The integrated power unit includes a gas turbine engine having a centrifugal compressor coupled to a turbine. A generator and/or hydraulic pump is coupled to the turbine engine to be driven thereby and there is an air inlet to the compressor. The system includes a first reservoir for a combustible fuel (such as aircraft fuel) and a first combustor for receiving and combusting compressed air from the compressor and fuel from the reservoir to generate gasses of combustion. Those gasses of combustion are fed to the turbine for normal operation of the same as an auxiliary power unit. The system further includes a second reservoir for containing a compressed oxidant for combusting fuel from the first reservoir. Preferably, the oxidant is a readily available stable material such as air or oxygen. A second combustor is provided for receiving and combusting fuel from the first reservoir and oxidant from the second reservoir to generate gasses of combustion Means are included for introducing fuel from the first reservoir into the gasses of combustion from the second combustor to vaporize such fuel and means are provided for directing combined gasses of combustion and vaporized fuel to the turbine to drive the same to thereby provide for emergency operation.

Because, in the preferred embodiment, in an emergency operation, the turbine is being driven by a combination of vaporized, uncombusted fuel and gasses of combustion from oxidation of the regular fuel by an oxidant such as air, the gasses flowing through the turbine during operation as an emergency power unit will have similar characteristics as those flowing through the unit when used as an auxiliary power unit. Thus, operation as an emergency power unit will have no more deleterious effect on subsequent turbine performance than operation of the unit as an auxiliary power unit. Furthermore, the use of an oxidant such as air with the conventional fuel already on board eliminates the addition of any chemical compound of less than desirable stability in favor of those required by the aircraft in any event. Consequently, the system does not require an increase in chemical hazard Furthermore, because the fuel is jet fuel and where the oxidant is air, both are readily available to avoid logistics difficulty in servicing.

In a preferred embodiment, the air inlet includes variable inlet guide vanes of a conventional construction which are conventionally intended to control the flow of air from the inlet to the compressor. Preferably, when the apparatus is in the emergency power unit mode, such vanes are employed to close the inlet. This effectively removes the vast majority of the load placed on the system during acceleration of the compressor and minimizes the need to provide for decoupling of the compressor from the turbine when the apparatus is utilized in the emergency power unit mode.

In flight operation at high altitude the inlet guide vanes further minimize the aerodynamic parasitic drag of the compressor and turbine. Thus the invention is particularly suitable for emergency operation at high altitudes.

In a highly preferred embodiment, the engine includes a turbine exhaust section and the second combustor is located within the exhaust section to conserve space and to take advantage of already present insulation materials. The invention also contemplates the second combustor include a combustion chamber surrounded by a fluid jacket with the fluid jacket being in fluid communication and interposed between the first reservoir and the introducing means so that the fuel to be vaporized cools the combustion chamber.

This feature of the invention enables combustion within the second combustor during the emergency power unit mode to occur at maximum temperature to make more thermal energy available for quickly vaporizing fuel to be fed to the turbine as vapor. This in turn increases the power density through the turbine which increases its response for start up as well as its power generating capability.

The invention also contemplates a method of operating such a turbine to generate emergency power which includes the steps of using the variable inlet guide vanes to substantially close the inlet while directing fuel and compressed oxidant to the second combustor to combust the same and directing fuel to the introducing means.

The invention contemplates that such steps are performed substantially simultaneously and that the endurance of the performance of the steps is sufficient long as to bring the engine up to a speed whereat it may operate on gasses of combustion from the first combustor.

In the highly preferred embodiment, the step of directing fuel and compressed oxidant to the second combustor is performed so that the oxidant and the fuel are combusted approximately stoichiometrically.

Other objects and advantages will become apparent from the following specification taken in connection with the accompanying drawings

DESCRIPTION OF THE PREFERRED EMBODIMENT

Figure 1:
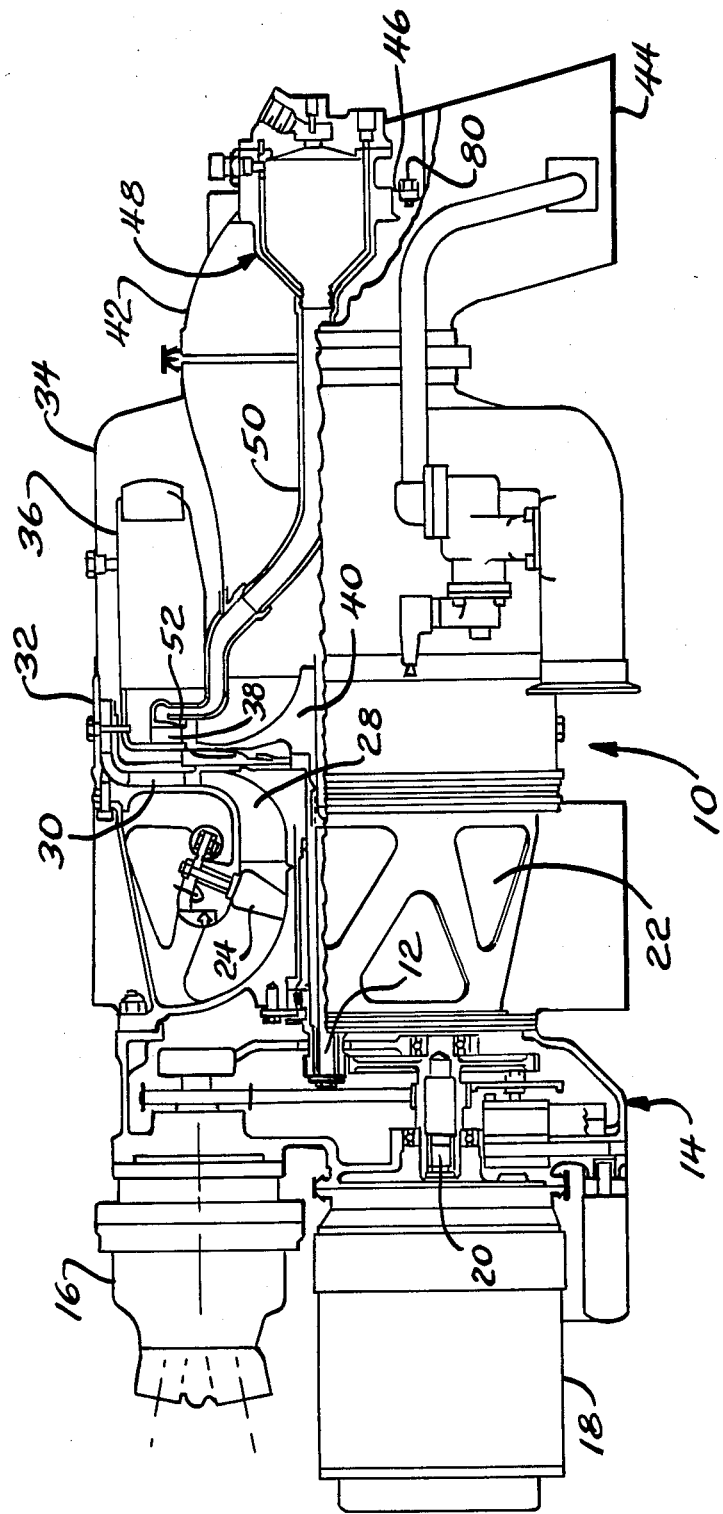
FIG. 1 is an elevational view of an integrated power unit made according to the invention with parts broken away for clarity.

An exemplary embodiment of an integrated power unit made according to the invention is illustrated in the drawings and with reference to FIG. 1 is seen to include a turbine engine, generally designated 10, having a shaft 12 entering a gearbox, generally designated 14. Mounted on the gearbox 14 are accessories such as a pump 16 and an electrical generator 18. The generator 18 includes an input shaft 20 geared to the shaft 12 within the gearbox 14. Thus, the turbine 10, when operating, will drive the generator 18 and the pump 16.

The engine 10 includes a conventional air inlet 22 which in turn is provided with a plurality of variable inlet guide vanes 24, only one of which is shown. The vanes 24 are operable in a conventional fashion for conventional purposes to control the flow of air from the inlet 22 to a conventional radial discharge compressor 28 mounted on the shaft 12. Vane modulation may also be used for increased surge margin A diffuser 30 of conventional construction is dispose radially outwardly of the compressor 28 in a housing 32. Compressed air from the compressor 28, after passing through the diffuser 30 is fed via conventional flow passages within a combustor 34 to an annular combustion chamber 36 whereat it is combusted. Gasses of combustion exit the combustion chamber 36 via a radial nozzle structure 38 which opens radially inwardly to a turbine 40, also on the shaft 12. Thus, the gasses of combustion resulting from combustion within the chamber 36 drive the turbine 40 to cause rotation of the shaft 12 which in turn drives both the compressor 28 and the various accessories including the generator 18 via the gearbox 14; and this mode of operation is that of an auxiliary power unit. If desired the turbine 40, which is illustrated as a single stage turbine, can be a plural stage turbine, having turbine wheels on several shafts.

The engine 10 also includes a turbine exhaust housing 42 of generally conventional construction save for modification shortly to be identified. The turbine exhaust housing 42 has an outlet opening 44 which is off of the axis of rotation of the shaft 12.

An opening 46 in the housing 42 oppositely of the turbine 40 provides a means whereby a second combustor, generally designated 48, may be disposed within the housing 42 for space conservation purposes Alternatively, the combustor may be located exteriorly of the housing 42 at any desired remote location Also within the housing 42, a conduit 50 extends from the outlet of the combustor 48 to a second annular nozzle assembly 52 about the turbine 40. The nozzle assembly 52 provides supersonic nozzles and as a consequence, it will be appreciated that gas under pressure from the combustor 48 will be applied to the turbine 40 to drive the same.

Figure 2:
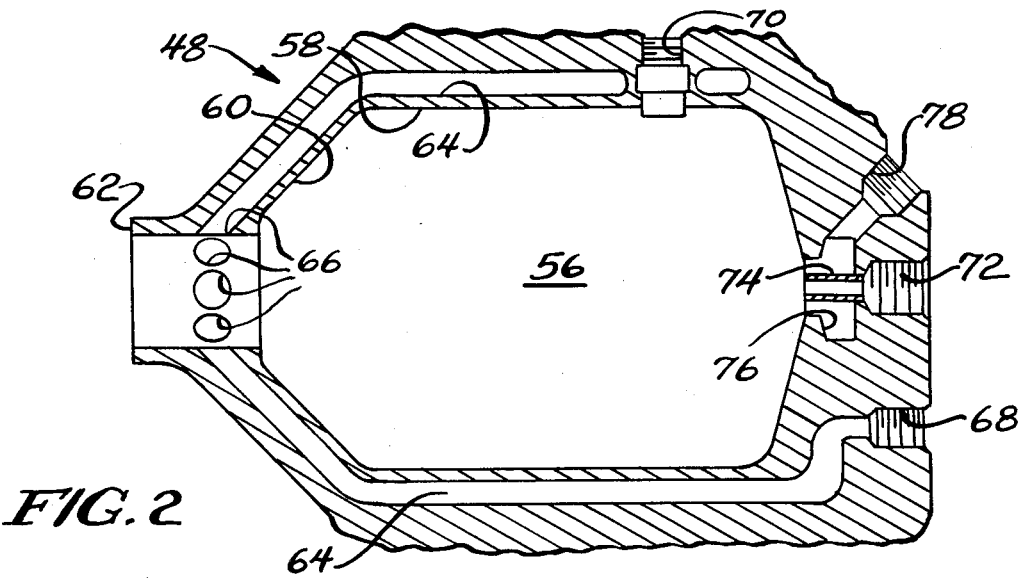
FIG. 2 is an enlarged sectional view of a combustor employed in the invention.

The combustor 48 is shown in greater detail in FIG. 2 and includes a combustion chamber 56 bounded by an interior cylindrical wall 58 terminating in a frustoconical wall 60 extending to an outlet 62 which is connected to the conduit 50. As can be seen, the combustion chamber 56 is jacketed by fluid flow passages 64 which extend to outlet openings 66 at the outlet 62. An inlet to the passages is provided at 68 and is adapted to receive fuel from the fuel tanks of the aircraft in which the integrated power unit is to be installed.

The combustor 48 also includes an opening 70 for receipt of an ignition device as well as an inlet 72 connected to an interior nozzle 74 on the axis of the combustion chamber 56 and through which fuel may be introduced into the combustion chamber 56 The inlet 72, like the inlet 68, is adapted to be connected to the fuel tanks for the aircraft in which the integrated power unit is to be installed.

An oxidant inlet chamber 76 is formed in the combustor 48 oppositely the outlet 72 and in surrounding relation to the nozzle 74. The inlet chamber 76 includes an inlet 78 which is adapted to be connected to a source of compressed oxidant as, for example, a storage bottle for compressed air shown schematically at 80 in FIGS. 3 and 4.

The combustor 48 is thus modular in form and may be installed as a module within the opening 48 and secured in place by means of threaded fasteners 80 (FIG. 1) only one of which is shown.

Figure 3:
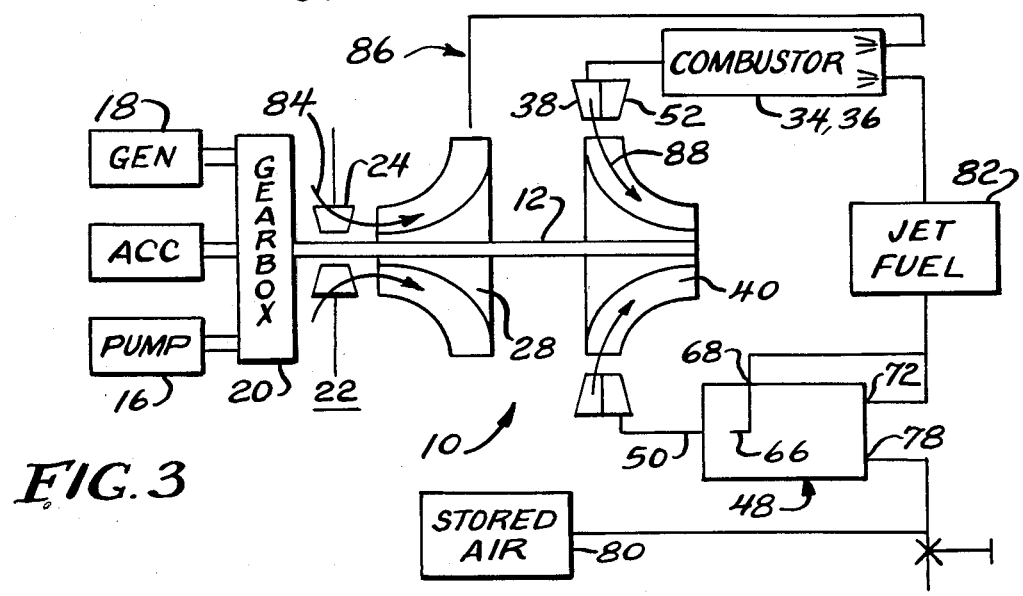
FIG. 3 is a schematic view of the invention operating in an auxiliary power unit mode.
Figure 4:
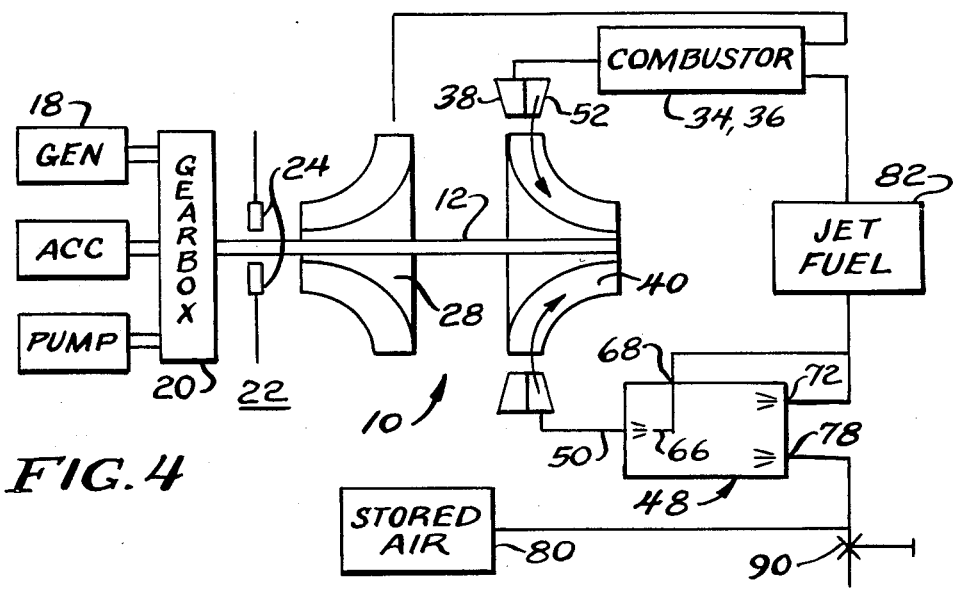
FIG. 4 is a schematic view like FIG. 3 but illustrating operation in the emergency power unit mode.

Turning now to FIGS. 3 and 4, fuel tanks for the system and for the aircraft for which it is installed are shown schematically at 82. Operation of the apparatus in auxiliary power unit mode is illustrated schematically in FIG. 3. In particular, with the engine 10 in operation, air is drawn through the inlet 22 and past the variable inlet guide vanes 22 in the direction illustrated by arrows 84 to the compressor 28. The same compresses such air which is then fed to the combustor 34, 36. In addition, some part of the compressed air may be drawn off as bleed air if required as indicated by an arrow 86.

Aircraft fuel from the tank 82 is also introduced into the combustor 34, 36 and burned therein in a conventional fashion. Combustion gas is ultimately discharged through the annular nozzle 38 against the turbine 40 as illustrated by arrows 88 to drive the same. That of course will result in the generator 18 and the pump 16 being driven by this connection to the shaft 12 through the gearbox 20. Thus, both electrical and hydraulic power and bleed air are made available during this mode of operation Control of the operation can be made conventionally including varying the inlet geometry by varying the positions of the variable inlet guide vanes 24.

When operated as an emergency power unit or as the starter mode for APU start initiation, system components are generally as illustrated in FIG. 4. In this connection, it will be noted that the variable inlet guide vanes 24 have been rotated to close the inlet 22 from the compressor 28. Thus, the compressor 28 will not be performing work in compressing air upon rotation of the shaft 12.

Stored oxidant, preferably air, from the storage bottle 80 is admitted to the combustor 48 via the inlet 78. At the same time, jet fuel from the aircraft tank 82 is entering the combustor 48 via the inlet 72. The two are combusted and in the process generate hot gasses of combustion. These hot gasses of combustion are fed by the conduit 50 by the annular nozzle 52. At the same time, fuel from the aircraft tank 82 is being introduced into the combustor 48 adjacent its outlet 62 via the flow path including the inlet 68 and the outlet openings 66. This fuel introduction is downstream of the combustion zone within the combustor 48 as will be readily appreciated from FIG. 2 and the fuel thus introduced will not burn. Rather, it will cool the gasses of combustion as well as the walls of the combustion chamber 56. In the process, such fuel will be vaporized and will flow to the annular nozzle structure 52 via the conduit 50. Thus, the combination of the hot gasses of combustion provided as the result of combustion within the combustor 48 as well as vaporized fuel now impinge upon the turbine 40 to drive the same to ultimately drive the generator 18 and pump 16. Preferably, oxidant and fuel fed into the combustor 48 are in the correct ratios so that the combustion reaction occurs stoichiometrically. This in turn maximizes the temperature of the gasses thus generated and the heat available from such combustion to thereby maximize the amount of fuel that can be vaporized as it emanates from the outlet openings 66. This in turn means that the mass flow rate of gas from the combustor 48 through the turbine 40 is maximized. Thus, upon start up in either the APU start mode or the emergency power unit mode, the engine 10 will be brought up to speed more rapidly and, once at speed, will produce more power. Typically, primary zone combustion temperatures of 3100° F. should be achieved within the combustor 48. After dilution of the gasses of combustion by the vaporized fuel, the temperature of the gasses to the turbine will be approximately 1200° F. to 1800° F., well within normal operating limits for such a machine.

The system allows use of a fuel to air ratio of about 1 to 2 as opposed to about 1 to 14 or 15 for a stoichiometric reaction. Yet, approximately the same output in terms of horsepower per pound of fuel is obtained meaning that the system substantially reduces the amount of air required when the system is operating in the emergency power mode over that which would be required if so operating strictly on gasses of combustion.

In operation, the engine 10 is brought up to speed in the emergency power unit mode or APU start mode in a very short period of time, less than four seconds. In many instances, even at high altitudes, once the engine 10 is at 90% of its operating speed, it may be switched out of the emergency power unit mode and into the auxiliary power unit mode to provide electrical power since many turbine engines such as that shown at 10 can operate normally on the air available at high altitudes once they have been brought up to 90% or more of their operating speed.

It should also be observed that those components of the system that enable it to function as an emergency power unit may be utilized in starting the system for use in an auxiliary power unit mode when on the ground. In particular, and as seen in FIGS. 3 and 4, the air inlet 78 to the combustor 48 may be connected via a valve 90 to an external source of air under pressure not shown. Using that source of air, the combustor 48 may be fired and the engine 10 brought up to speed as mentioned previously Once up to desired speed, the vanes 24 may be opened and combustion initiated within the combustor 34, 36 to maintain the engine 10 in operation in the auxiliary power unit mode.

This feature of the invention is highly desirable in a typical aircraft environment In particular, while the aircraft is on the ground and prior to flight, there will typically be a requirement for use of the system in the auxiliary power unit mode. This, of course, requires that the engine 10 be started and utilizing the equipment required to cause the system to operate in an emergency power unit mode as a means of starting the engine 10, and then switching over to the auxiliary power unit mode, operability of the system in both modes is necessarily checked prior to flight. Further, note APU start reliability is significantly enhanced with this system because even if ignition failure occurred in the combustor 48, a normal cold air start will still be accomplished.

Other features of the invention likewise contribute to its utility. For example, the installation of the second combustor 48 within the turbine exhaust housing conserves on space requirements as noted previously. In addition, because it is located in an area which already must be provided with heat isolation insulation because of the hot temperatures of the turbine exhaust, no other additional treatment for temperature isolation need be made. And its installation or removal as a module provides for ease of servicing.

Further, the use of the variable inlet guide vanes 24, which desirably will be present in the turbine engine 10 in any event, to remove the load from the compressor 28 during start up and operation of the apparatus in the emergency power unit mode minimizes any need for mechanical decoupling devices and the possibility of failure that goes with them.

We claim:

1. An integrated power unit alternatively operable as an auxiliary power unit and as an emergency power unit and comprising:
   a gas turbine engine including a centrifugal compressor and a turbine;
   a generator coupled to said turbine engine to be driven thereby;
   an inlet to said compressor including at least one variable inlet guide vane for controlling the flow of air from said inlet to said compressor;
   a first reservoir for a combustible fuel;
   a first combustor for receiving and combusting compressed air from said compressor and fuel from said first reservoir to generate gasses of combustion and feeding said gasses of combustion to said turbine;
   a second reservoir for containing a compressed oxidant for combusting fuel from said first reservoir;
   a second combustor for receiving and combusting fuel from said first reservoir and oxidant from said second reservoir to generate gasses of combustion;
   means for introducing fuel from said first reservoir into the gasses of combustion from said second combustor to vaporize such fuel; and
   means for directing combined gasses of combustion and vaporized fuel to said turbine to drive the same.

2. The integrated power unit of claim 1 wherein said engine includes a turbine exhaust section and said second combustor is located in said exhaust section.

3. The integrated power unit of claim 1 wherein said second combustor includes a combustion chamber surrounded by a fluid jacket, said fluid jacket being in fluid communication with and interposed between said first reservoir and said introducing means so that fuel to be vaporized cools said combustion chamber.

4. An integrated power unit alternatively operable as an auxiliary power unit and as an emergency power unit and comprising:
   a gas turbine engine including a centrifugal compressor and a turbine;
   a generator coupled to said turbine engine to be driven thereby;
   a hydraulic pump coupled to said turbine engine to be driven thereby;
   an air inlet to said compressor;
   a first reservoir for a combustible fuel;
   a first combustor for receiving and combusting compressed air from said compressor and fuel from said first reservoir to generate gasses of combustion and feeding said gasses of combustion to said turbine;
   a second reservoir for containing a compressed oxidant for combusting fuel from said first reservoir;
   a second combustor for receiving and combusting fuel from said first reservoir and oxidant from said second reservoir to generate gasses of combustion;
   means for introducing fuel from said first reservoir into the gasses of combustion from said second combustor to vaporize such fuel; and
   means for directing combined gasses of combustion and vaporized fuel to said turbine to drive the same.

5. An integrated power unit alternatively operable as an auxiliary power unit and as an emergency power unit and comprising:
   a gas turbine engine including a centrifugal compressor and a turbine;
   a generator coupled to said turbine engine to be driven thereby;
   an air inlet to said compressor;
   an exhaust housing for conveying gasses of combustion from said turbine to an exhaust outlet;
   a first reservoir for a combustible fuel;
   a first combustor for receiving and combusting compressed air from said compressor and fuel from said first reservoir to generate gasses of combustion and feeding said gasses of combustion to said turbine;
   a second reservoir for containing a compressed oxidant for combusting fuel from said first reservoir; and
   a second combustor for receiving and combusting fuel from said first reservoir and oxidant from said second reservoir to generate gasses of combustion, said second combustor being disposed in said exhaust housing.

6. The integrated power unit of claim 5 wherein said second combustor constitutes a modular combustor removable as a module form said exhaust housing.

* * * * *